United States Patent
Caraveo-Martinez

(10) Patent No.: US 8,454,001 B2
(45) Date of Patent: Jun. 4, 2013

(54) EMISSION PURIFYING SYSTEM AND DEVICE FOR SLOWING GLOBAL WARMING

(76) Inventor: Miguel Angel Caraveo-Martinez, Tabasco (MX)

(*) Notice: Subject to any disclaimer, the term of this patent is extended or adjusted under 35 U.S.C. 154(b) by 327 days.

(21) Appl. No.: 12/876,288

(22) Filed: Sep. 7, 2010

(65) Prior Publication Data

US 2011/0221080 A1 Sep. 15, 2011

Related U.S. Application Data

(63) Continuation-in-part of application No. PCT/MX2009/000019, filed on Feb. 23, 2009.

(30) Foreign Application Priority Data

Mar. 6, 2008 (MX) .................... MX/a/2008/003569

(51) Int. Cl.
*B01F 3/04* (2006.01)

(52) U.S. Cl.
USPC ........... 261/141; 261/147; 261/153; 261/160; 261/115; 261/DIG. 9

(58) Field of Classification Search
USPC ................. 261/141, 147, 149, 153, 157, 160, 261/115, DIG. 9, DIG. 10
See application file for complete search history.

(56) References Cited

U.S. PATENT DOCUMENTS

| | | | | |
|---|---|---|---|---|
| 1,024,326 A | * | 4/1912 | Gowder | 261/88 |
| 1,062,446 A | * | 5/1913 | Ernst | 96/262 |
| 1,563,125 A | * | 11/1925 | Ward | 96/358 |
| 1,652,956 A | | 12/1927 | Purtyman | |
| 2,998,097 A | | 8/1961 | Baxter | |
| 3,154,406 A | * | 10/1964 | Allard | 75/378 |
| 3,289,732 A | * | 12/1966 | Kotelnikov et al. | 159/4.02 |
| 3,353,335 A | | 11/1967 | Caballero | |
| 3,504,894 A | * | 4/1970 | Samples et al. | 261/116 |
| 3,668,841 A | | 6/1972 | Nunn | |
| 3,885,919 A | * | 5/1975 | Pillard | 422/111 |
| 4,158,702 A | * | 6/1979 | Archer | 423/210 |

FOREIGN PATENT DOCUMENTS

GB 1386861 A 3/1975

OTHER PUBLICATIONS

PCT/MX09/00019 Int'l search report dated May 13, 2009.

* cited by examiner

*Primary Examiner* — Charles Bushey
(74) *Attorney, Agent, or Firm* — Matthew J. Lattig; Charter IP, LLC

(57) ABSTRACT

An emission purifying system and device for slowing global warming is provided herein which may eliminate the pollutant gases produced by combustion. The system uses a pump with waterfall, bubbling, airing, lubricating and liquefying sub-systems to catch and store the combustion gases, thus reducing the temperature of the combustion, potentially preventing global warming effects and acid rain, eliminating the noise produced by combustion as well as the characteristic odors, while utilizing the produced thermal energy to transform it into steam and kinetic energy for a variety of uses.

20 Claims, 14 Drawing Sheets

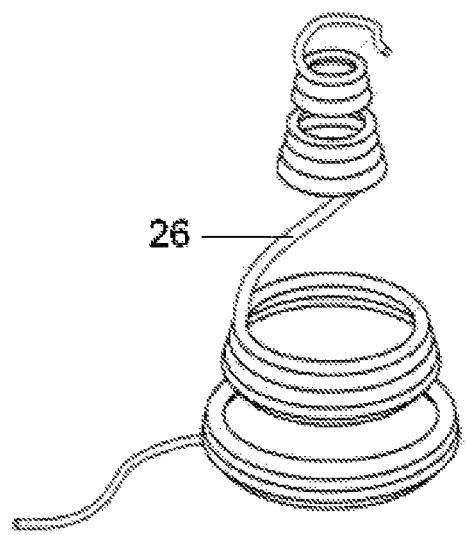
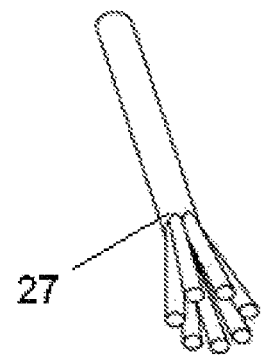
FIG. 10　　　　　　　　　　FIG. 11
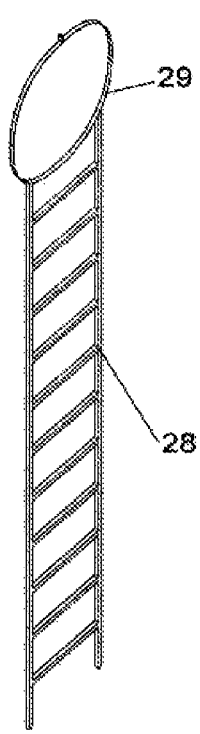
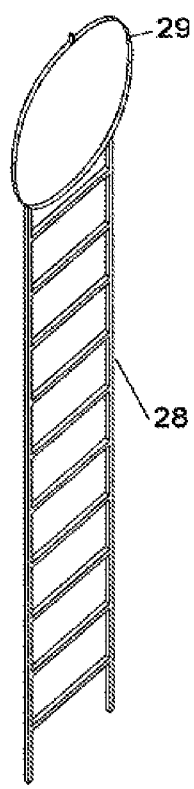
FIG. 12　　　　　　　　　　FIG. 13

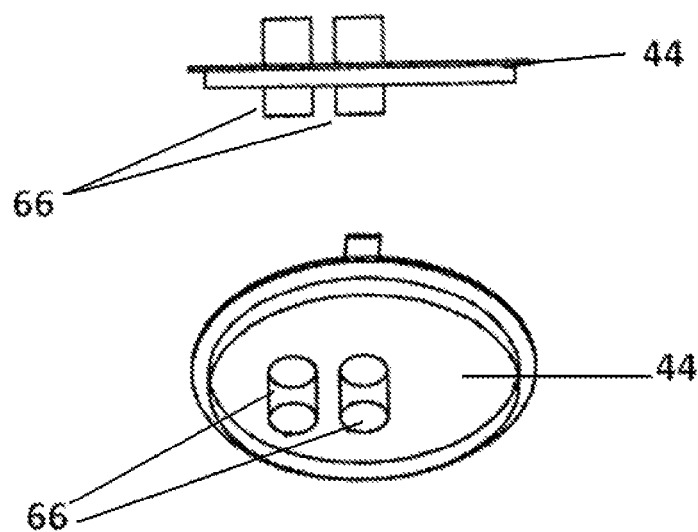
FIG. 18A
FIG. 18B
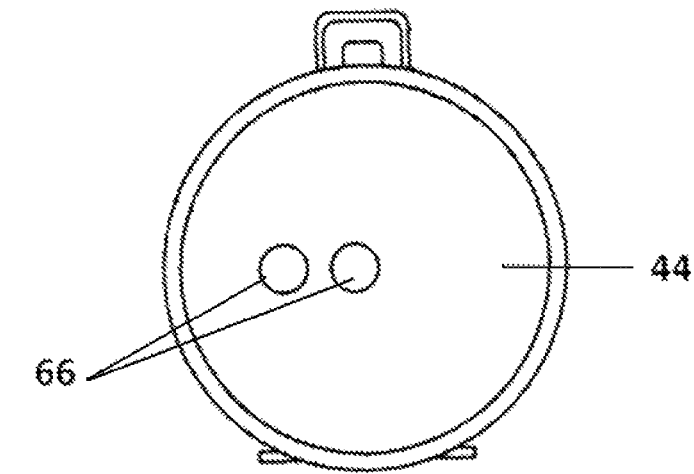
FIG. 18C

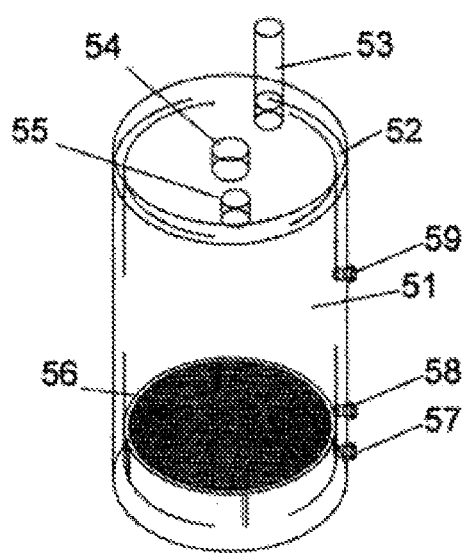
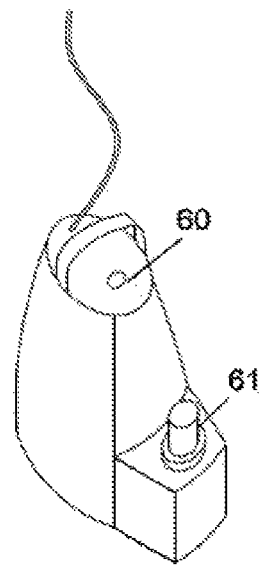
FIG. 25　　　　　　　　　FIG. 26
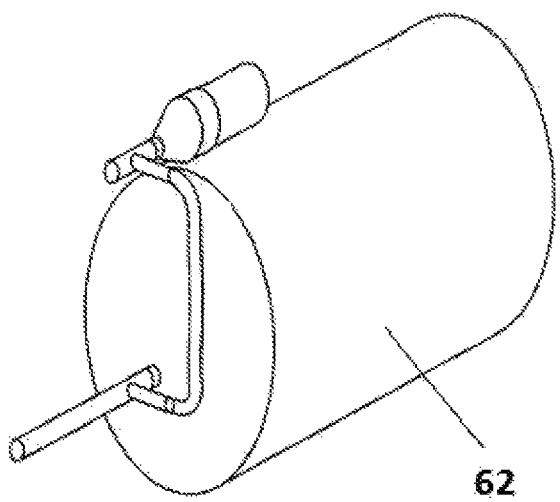
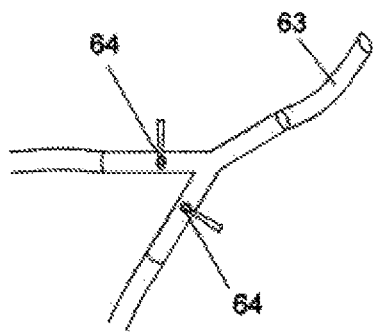
FIG. 27　　　　　　　　　FIG. 28
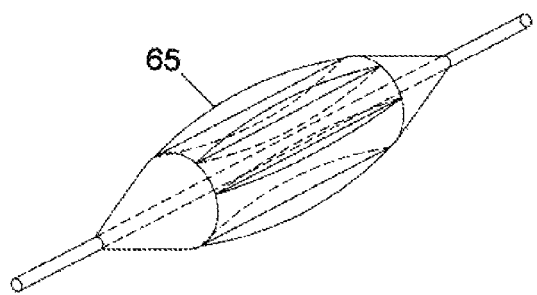
FIG. 29

EMISSION PURIFIYING SYSTEM AND DEVICE FOR SLOWING GLOBAL WARMING

PRIORITY STATEMENT AND CROSS-REFERENCE TO RELATED PATENT APPLICATIONS

This application is a continuation-in-part of and claims the benefit under 35 U.S.C. §120, per 35 U.S.C. §365(c), of PCT/MX09/00019 to Miguel Ángel CARAVEO MARTÍNEZ filed Feb. 23, 2009 and entitled "ENVIRONMENTALLY FRIENDLY DEVICE FOR SLOWING GLOBAL WARMING, ALSO KNOWN AS AN EMISSION PURIFYING SYSTEM", now pending, which in turn claims priority to co-pending Mexico patent application number MX/a/2008/003569 by the same inventor, filed Mar. 6, 2008. The entirety of the contents of each application is hereby incorporated by reference herein.

BACKGROUND

1. Field

The example embodiments in general are directed to an emission purifying system and to a device for slowing global warming in the field of pit burners and elevated burners in the oil industry, including incinerators, open air burnings and other industries where suspended polluting particles are produced.

2. Related Art

Global warming is a matter of serious concern due to its potential effects on human health, economy and environment. Global warming has been associated with effects like the decrease of snow precipitation in some places, the rise in sea level and recent changes in the climate. These environmental changes can affect human activities and ecosystems. Some species can be forced to emigrate to avoid extinction by changing climate conditions.

Global warming can result in a rise of sea level because the water in the oceans expands as it is warmed. Additionally, the melting of the ice shelf and glaciers contributes to increasing the volume of the water in seas.

Climate has always been variable. The issue with climate in the last century is that climate change has been exacerbated in an anomalous way to such extent that life on earth is now being affected. In the search for causes of this exacerbation, scientists have found that there is a direct relation between global warming or climate change and an increase in the emissions of greenhouse gases to the atmosphere. These greenhouse gases are believed to primarily originate from industrial societies.

Today, global warming and its direct effect on climate change are phenomena of worldwide concern, particularly among scientists, who spend most of their time and effort studying and learning ways to control greenhouse gas release. Scientists claim that this phenomenon threatens the future of the human race. Many scientists agree that increasing greenhouse gas concentration in the atmosphere results in alterations in the global climate. They also agree that the emission of greenhouse gases has been more intense since the beginning of the Industrial Revolution. It has to be mentioned that all industries emit carbon monoxide, sulfur oxides and all kinds of pollutants to the atmosphere which degrade the quality of the air. In particular, pit burners and elevated open sky burners operated by the world oil industry are most likely the primary violators, as set forth below.

Each burner emits not only pollutant particles, but also raw heat at temperatures ranging from 1200° C. to 1800° C. This constant, extreme and permanent heat in the atmosphere imparts extreme power into air streams, where storms, rains, tornados, snow storms, cyclones and heat waves are formed. This insertion initiates a domino effect which affects the planet and ecosystems in a chain.

On the other hand, greenhouse gases are expanding quickly in the atmosphere because the world burns vast quantities of fossil fuels and destroys forests and prairies which could absorb carbon dioxide and help maintain the equilibrium of the temperature. In view of this, the international scientific community has alerted the public that if the world development, the demographic growth and the energetic consumption based on fossil fuels continues growth at its current pace, by the year 2050 the concentration of carbon dioxide will have doubled with respect to rates prior to the Industrial Revolution.

This could bring about dire consequences for life on the planet, and could even reach the point when it would be impossible to live because of lack of oxygen of bad air quality. Every living, breathing organism would be the first to feel the impact of the latter. It is possible that there are no regions on Earth which will not become adversely affected by this enormous problem.

Numerous attempts by industry and governments have been made to reduce emissions, such as through regulation or technological advances in order to reduce the carbon dioxide emissions and/or pollutant suspended particles exhausted from motor cars and internal combustion engines. However, less effort has been directed on industrial fumes.

One conventional system includes an anti-pollution chamber that consists of a structure which supports a hollow horizontal conic body provided with nozzles to feed in previously filtered water, recycling it to a powdering system. This system does not consider a combination of two conical structures, the use of a screen, or an additional driver to prevent counter-pressure. Additionally, this conventional system does not employ a heat retrieval system to take advantage of the combustion gases to transform the heat in reusable energy.

Another conventional system is directed to a vertical conical emissions purifying device. The device includes nozzles to spread in water and has optional screening walls. This conventional device is conformed only by a vertical structure and does not consider heat retrieval. The device only takes into consideration the treatment of gases, but again does not consider the retrieval and reuse of combustion gases.

A further conventional system is directed to an exhaust gases treatment system attached to combustion chambers, with an input to a horizontal depurator which in turn is connected to the exit of the combustion chambers. This conventional exhaust system includes water nozzles, ventilation to displace the air, a filter and a storage tank as well as a cooler before the reused water recirculation. However, this system also does not contemplate recovering and reusing the heat of combustion gases.

Yet another conventional system is directed to a wet gas purifier that envisions a horizontal separator, water sprinkler systems, recirculation and storage tank, and two separating walls which can be made of a gas permeating material acting as screens. The conventional wet gas purifier, like the other conventional pollutant removal systems, is silent as to the recovery and reutilization of the combustion heat.

Although a fundamental of each of these conventional pollutant removal systems is the cleansing of combustion gases using a variety of systems, none utilize a heat retrieval system to take advantage of the combustion gases to transform the heat in reusable energy. These conventional systems therefore cannot address or solve the problem of gas cleansing.

SUMMARY

An example embodiment is directed to an emissions purifying system. The system includes a vertical conical section having a body with a wider conical base and tapering into a narrower conical top, with a plurality of diffuser discs fitted in spaced relation around an external surface of the vertical conical section. The diffuser discs support cooling piping for transferring heat from combustion gases thereto. The system includes a horizontal conical section connected to the vertical conical section, the horizontal conical section having a body with a first wider conical end and a narrower second conical end, the horizontal conical section including a chimney, an elevated tank supplied with water and supported by a base within the vertical conical section, and a burner situated under the elevated tank. Combustion gases ascending over the vertical conical section to be driven up to the horizontal conical section pass over the elevated tank and release heat to the tank. The retrieved heat is utilized to generate steam in the elevated tank to be transformed into work. The diffuser discs serve as a support for the cooling piping to diminish the temperature of the combustion gases. A narrowest end of the horizontal conical section is situated in a lower position with respect to the rest of the body and includes piping for water collection in a lowest end of the horizontal conical section. The chimney is oriented upwards near the narrowest end through which cleansed combustion gases are expelled.

Another example embodiment is directed to a device for slowing global warming. The device includes a vertical cone having a body with a wider conical base and tapering into a narrower conical top, the body supporting cooling piping on an external surface thereon for transferring heat from combustion gases thereto. The device includes a horizontal conical section attached above the vertical conical section, the horizontal conical section having a body with a first wider conical end and a narrower second conical end, the horizontal conical section including a chimney, an elevated tank supplied with water within the vertical conical section, and a burner situated under the elevated tank. Combustion gases ascending over the vertical conical section to be driven up to the horizontal conical section pass over the elevated tank and release heat to the tank. A narrowest end of the horizontal conical section includes piping for water collection. The chimney is oriented upwards near the narrowest end through which cleansed combustion gases are expelled.

Another example embodiment is directed to an emissions purifying system. The system includes a vertical cone having a body with a wider conical base and tapering into a narrower conical top, the body supporting a plurality of diffuser discs on an external surface thereof, a cooling coil supported by the diffuser discs for transferring heat from combustion gases thereto, a horizontal conical section attached above the vertical conical section, the horizontal conical section having a body with a first wider conical end and a narrower second conical end, the horizontal conical section including a plurality of circular screens fitted in different sections therein, a plurality of sprinklers in spaced relation thereon, and a chimney, an elevated tank supplied with water within the vertical conical section, and a burner situated under the elevated tank. Combustion gases ascending over the vertical conical section to be driven up to the horizontal conical section pass over the elevated tank and release heat to the tank. The combustion gases are cooled inside the vertical conical section by direct contact with the elevated tank and externally by the cooling coil. The vertical conical section is connected to the horizontal conical section near the wider conical base via an elbow that drives the cooled combustion gases to the narrower end and increases the drop of pressure of the combustion gases. The air extractors move the cooled combustion gases to the narrower end for cleansing and cooling by the screens and sprinklers, precipitating any suspended particles into a stream of water. A narrowest end of the horizontal conical section includes piping for water collection, and the chimney is oriented upwards near the narrowest end through which cleansed combustion gases are expelled.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments thereof.

FIG. 10 is an isometric view of a cooling coil, in accordance with the example embodiments.

FIG. 11 is an isometric view of a flow distributor, in accordance with the example embodiments.

FIG. 12 is an isometric view of a long ladder element according to the example embodiments.

FIG. 13 is an isometric view of a short ladder element according to the example embodiments.

FIG. 18 illustrates side, perspective and top views of a tight-fit lid of the horizontal cone according to the example embodiments.

FIG. 25 is an isometric view of a storage tank for captured particles that forms part of the emission purifying system and device according to the example embodiments.

FIG. 26 is an isometric view of a submersible pump for the storage tank of FIG. 25.

FIG. 27 is an isometric view of a hydro pneumatic tank that forms part of the emission purifying system and device according to the example embodiments.

FIG. 28 is an isometric view of a "Y" connector connected to the submersible pump of FIG. 26.

FIG. 29 is an isometric view of a heat collector cylinder that forms part of the emission purifying system and device according to the example embodiments.

DETAILED DESCRIPTION

The example embodiments to be heretofore described were developed with a purpose of decelerating the world climate change caused by global warming; originated by the emission to the atmosphere of polluting gases. The example system and device may contribute to the reduction of acid rain, temperature of emissions, as well as noise produced by the pressure of the fuel in the burners. One result or output of the example system and/or device is steam, which produces thermal and kinetic energy for a variety of uses. As will be shown in more detail hereafter, the example system and device also concentrates suspended particles and settles these particles in a deposit for diverse applications.

Thus, in an effort to mitigate this enormous world problem, the example system and/or device described hereafter reverts some of the negative effects caused by global warming because the system/device produces clean energy when applied to sectors where there are emissions of pollutant suspended particles given off by combustion. The example system/device is efficient and could prove to be beneficial by preventing ecosystems (including the human race) from downstream damage to some extent due to the domino effect mentioned above.

Accordingly, the example embodiments shall describe in further detail a stationary, air portable system configured to capture and collect pollutant suspended particles, prevent clean air from getting polluted as well as preventing fire, fumes and radiated heat from reaching the atmosphere, thus potentially decelerating global warming. The same example system and/or device may potentially suppress combustion odors and reduce acid rain. Moreover, the example system and/or device utilizes thermal energy in the form of steam to transform the heat into kinetic energy, thus reducing the temperature of emissions and noise generated by the pressure of fuel in the burners.

In general, the example system and/or device may be geometrically formed by two cones, a vertical cone 23 and a horizontal cone 37. The cones 23, 37 are supported on an airborne stationary metallic frame base 1 which covers or encapsulates the combustion or chimney where it is desired to cleanse combustion gases.

Figure 1:
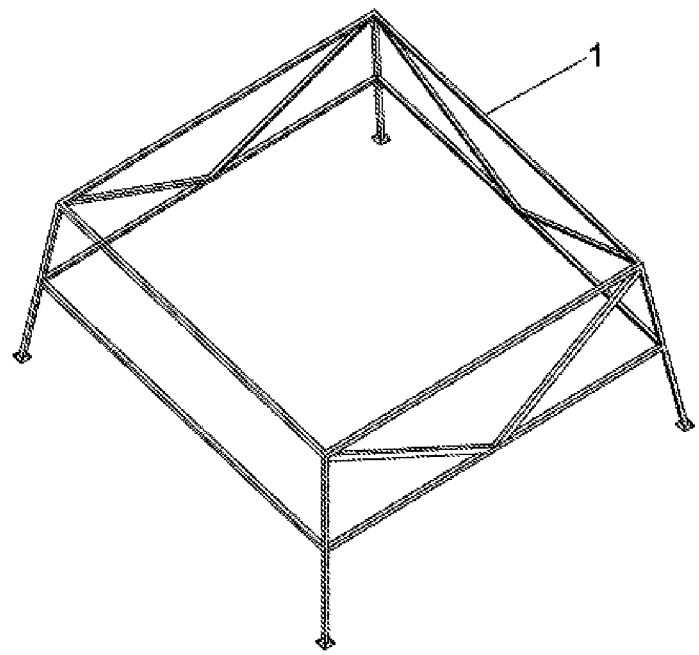
FIG. 1 is an isometric view of a supporting table of a vertical cone that forms part of the emission purifying system and device according to the example embodiments.
Figure 2:
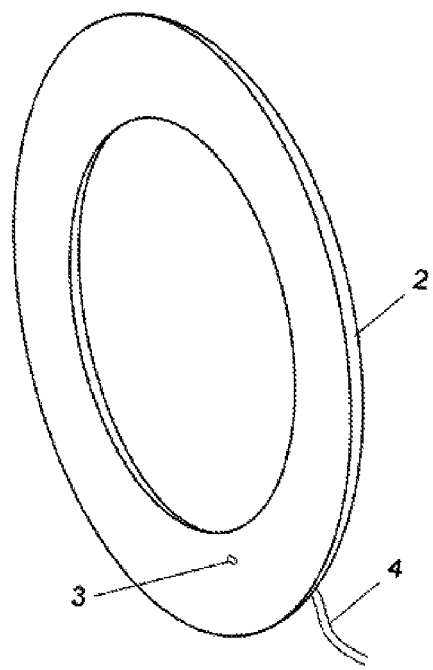
FIG. 2 is an isometric view of a circular channel included in the vertical cone, according to the example embodiments.

FIG. 1 is an isometric view of a supporting table of a vertical cone that forms part of the emission purifying system and device according to the example embodiments; FIG. 2 is an isometric view of a circular channel included in the vertical cone; and FIG. 3 is an isometric view of a circular beam used to hold the vertical cone, according to the example embodiments.

Figure 3:
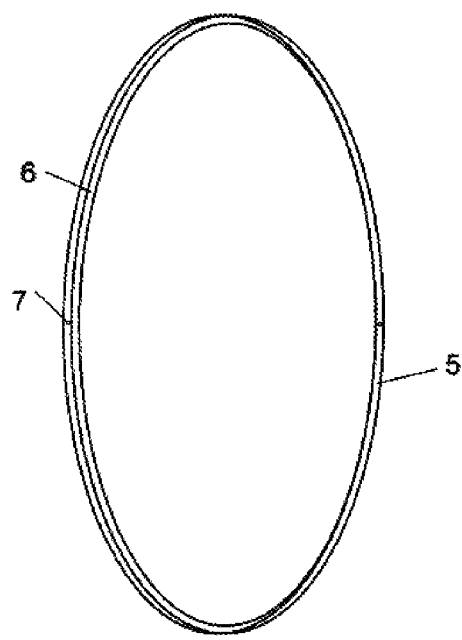
FIG. 3 is an isometric view of a circular beam used to hold the vertical cone, according to the example embodiments.

Referring to FIGS. 1-3, the supporting table 1 has a generally square shape and the central part thereof is free of any structure. The circular channel 2 has an element 3 consisting of a piercing which has a draining pipe connected to it and which further includes an element 4. The circular beam 5 is used to hold the vertical cone 23 and supporting table 1, whose structure has four piercings oriented to the four cardinal points of element 7 and a rim or flange to fix the vertical cone 23.

The supporting table 1 of the vertical cone 23 is thus placed. The combustion point, chimney or burner (not shown) is to be accommodated inside. The circular channel 2 is fitted on the supporting table 1 of the vertical cone 23. The circular beam 5 is the placed on the circular channel 5 and secured to the supporting table 1 with suitable fasteners, such as screws, for example.

Figure 4:
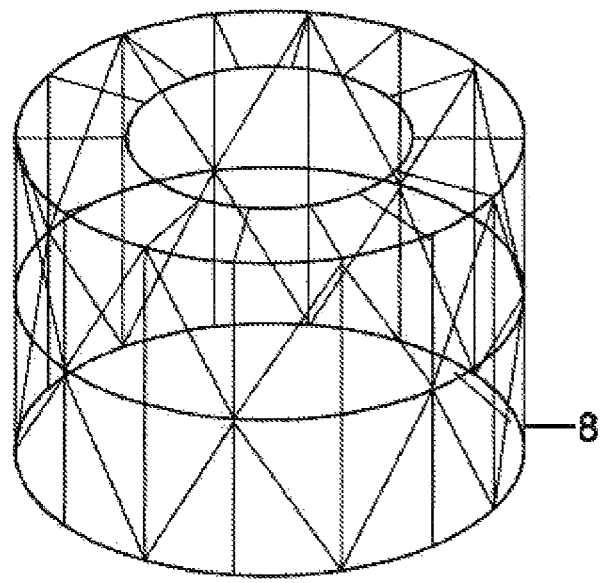
FIG. 4 is an isometric view of a base for an elevated tank which supports the vertical cone, according to the example embodiments.
Figure 5:
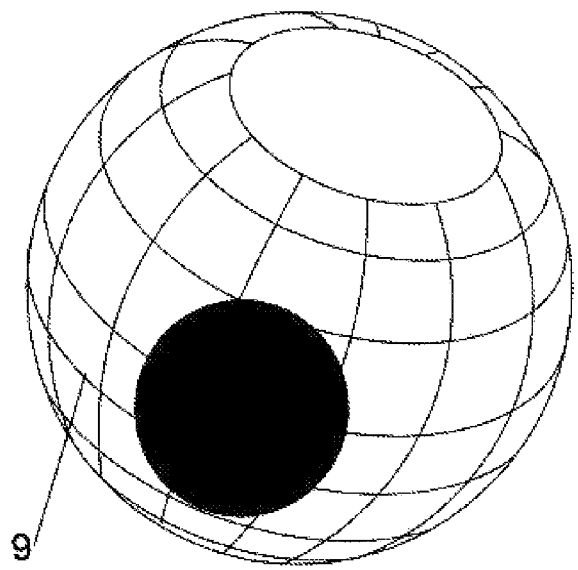
FIG. 5 is an isometric view of an ignition sphere that forms part of the emission purifying system and device according to the example embodiments.
Figure 6:
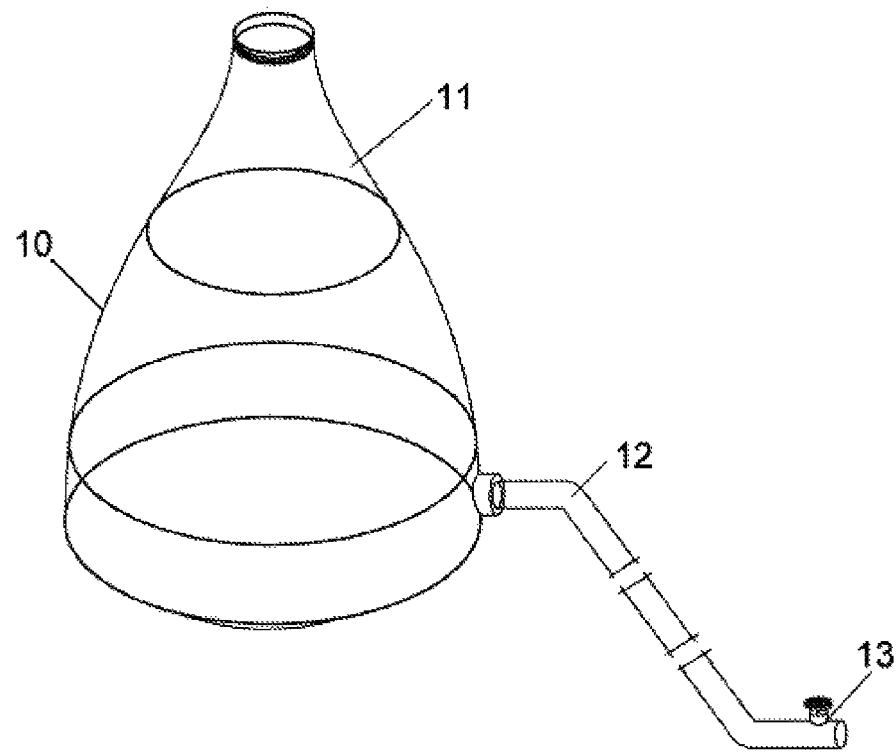
FIG. 6 is an isometric view of an elevated thermic energy-producing tank situated within the vertical cone.

FIG. 4 is an isometric view of a base for an elevated tank which supports the vertical cone, according to the example embodiments; FIG. 5 is an isometric view of an ignition sphere that forms part of the emission purifying system and device according to the example embodiments; FIG. 6 is an isometric view of an elevated thermic energy-producing tank situated within the vertical cone; and FIG. 7 is an isometric view of a lid and elevated tank structure that forms part of the emission purifying system and device according to the example embodiments.

Referring to FIGS. 4-7, the base 8 of the elevated tank has a generally cylindrical shape. The central part of the tank 10 is free of any structure. The ignition sphere 9 includes an external canister with mineral coal or volcanic rock in the center. The elevated thermic energy-producing tank 10 has a convex bottom and a conical configuration as well as a bottleneck 11 with internal and external thread, to which an output drain 12 has been adapted for maintenance purposes, and a shutoff valve 13. The convex-shaped bottom 10, which tapers to the bottleneck 11 top, helps to facilitate the distribution of heat outside the tank body.

Figure 7:
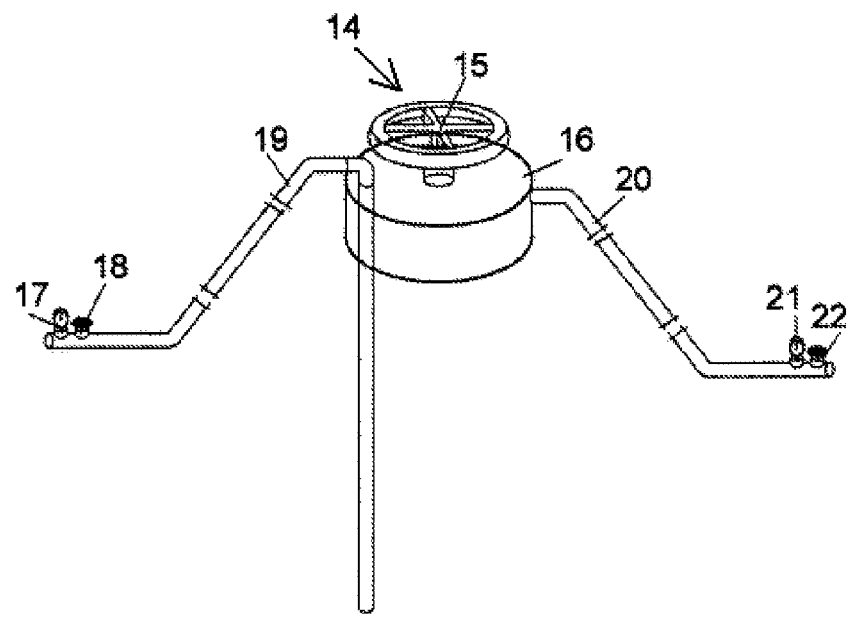
FIG. 7 is an isometric view of lid and elevated tank structure that forms part of the emission purifying system and device according to the example embodiments.

The lid structure 14 for the elevated tank 10 as shown in FIG. 7 includes a fill side and exit side. Lid structure 14 includes a filling system having a pipe 19 with a shutoff valve 18 and a water volume meter 17. The Lid structure 14 further includes a valve seal 15 and a tight-fitting lid 16 thereon. The exit side (steam exit) includes a pipe 20 with a valve 22 and a manometer 21.

The base 8 of the elevated tank 10 is placed onto the supporting table 1 of the vertical cone 23 in a concentric position with respect to the burner. Now the ignition sphere 9 shown in FIG. 5 is placed in the base 8 of the elevated tank 10.

The elevated tank 10 of FIG. 6 is also placed on this base 8. The lid 16 of the elevated tank 10 is secured thereon, then the vertical cone 23 is placed on the circular channel 2 an secured with fasteners such as screws to the circular beam 5 covering the elevated tank 10, so as to cover the base 8 of the elevated tank 10. Thus, the vertical cone 23 rests on the supporting table 1.

Figure 8:
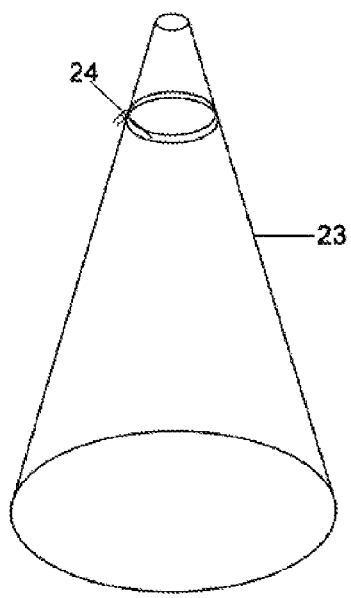
FIG. 8 is an isometric view of the vertical cone in accordance with the example embodiments.
Figure 9:
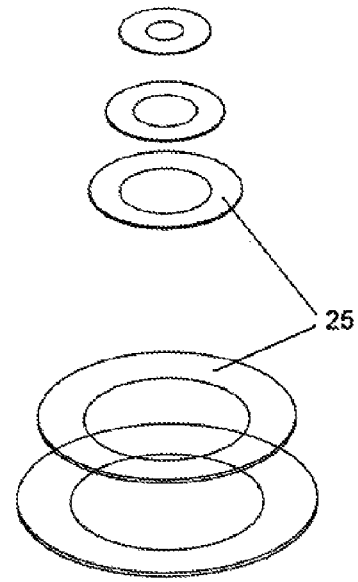
FIG. 9 shows isometric views of various heat diffuser discs according to the example embodiments.

FIG. 8 is an isometric view of the vertical cone; FIG. 9 shows isometric views of various heat diffuser discs; and FIG. 10 is an isometric view of a cooling coil, in accordance with the example embodiments. Referring to FIGS. 8-10, the vertical cone 23 is configured as a tubular annular or circular sprinkler 24 with an external input. Each of the heat diffuser discs 25 with different diameters in FIG. 9 includes a concentric vacuum. The diffuser discs 25 are inserted on the vertical cone 23, and the cooling coil 26 is placed on the diffuser discs 25 so as to cover the vertical cone 23.

Figure 14:
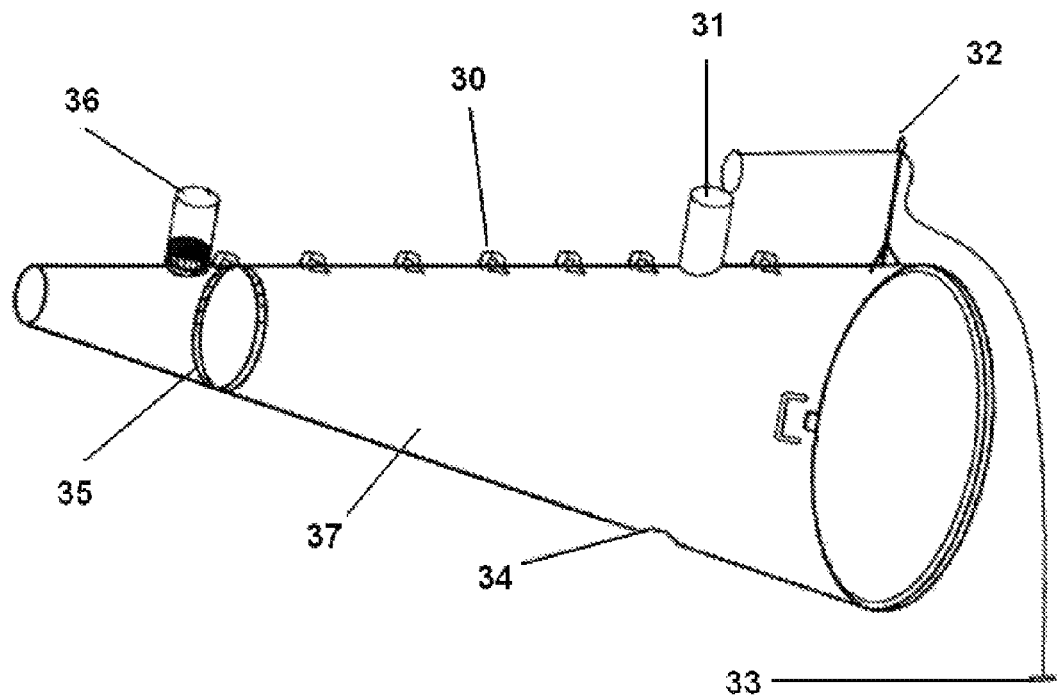
FIG. 14 is an isometric view of horizontal type cone with constituent components thereof, in accordance with the example embodiments.

FIG. 11 is an isometric view of a flow distributor; FIG. 12 is an isometric view of a long ladder element; FIG. 13 is an isometric view of a short ladder element; and FIG. 14 is an isometric view of horizontal type cone with constituent components thereof, in accordance with the example embodiments. Referring to FIGS. 11-14, the flow distributor 27 comprises a ramification of connectors. Each of the long ladder element 28 and short ladder element 28' includes a folding ring 29.

The horizontal type cone 37 includes a circular sprinkler 35, a security chimney with a lid 31, a whip 33, a permanent exit chimney 36 with a filter-screening system 46/47, a sprinkler system which includes a plurality of sprinkles 30 in spaced relation thereof along a surface of the horizontal cone 37, an orifice 34 for the insertion of the vertical cone 23 and a lightning rod 32.

This cooling coil 26 is connected at the bottom to one of the lines of the flow distributor 27 and connected on the top to a sprinkler 30. Now, the long ladder 28 and the short ladder 28' with the folding ring 29 are fixed to the supporting table 1 of the vertical cone 23, with horseshoe-type clamps (not shown). The long and short ladders 28, 28' are also fixed to the ground with retained-type suspenders. The horizontal cone 37 is installed inside the folding rings 29 of the ladders 28, 28'.

Figure 15:
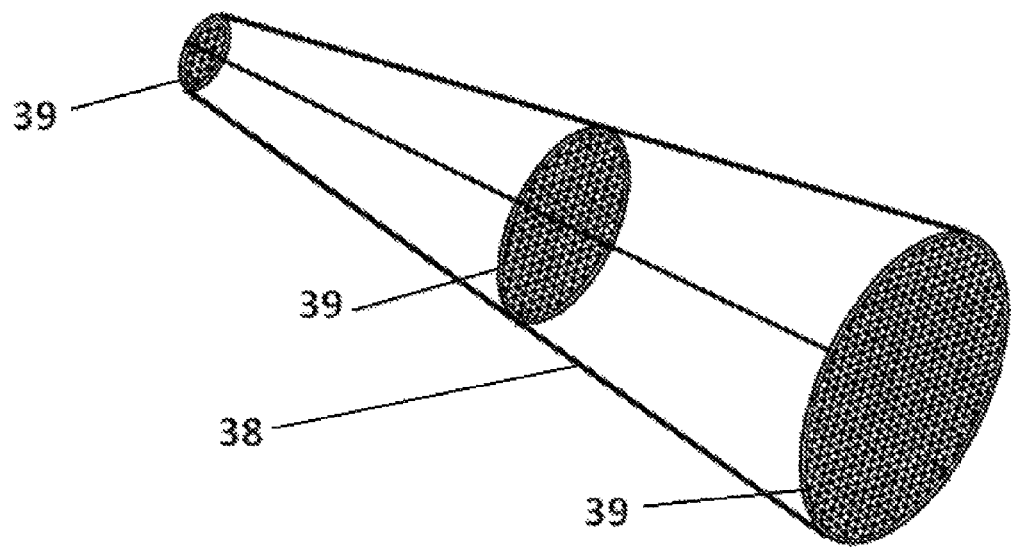
FIG. 15 is an isometric view of a screening system for the horizontal cone of FIG. 14.
Figure 16A:
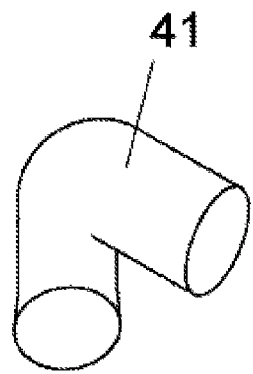
FIG. 16A is an isometric view of a cone without an orifice.
Figure 16B:
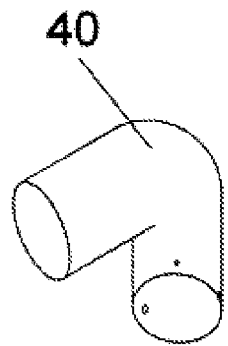
FIG. 16B is an isometric view of a cone with an orifice.
Figure 17:
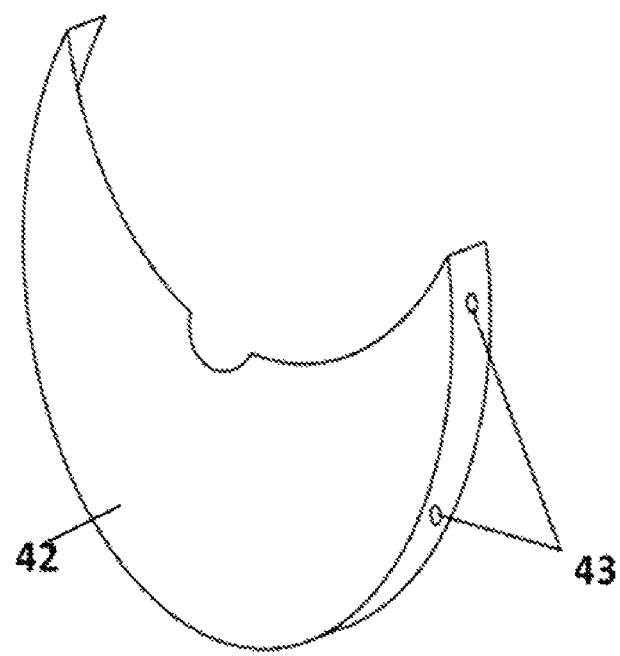
FIG. 17 is an isometric view of a semi-circular retainer according to the example embodiments.

FIG. 15 is an isometric view of a screening system for the horizontal cone of FIG. 14; FIG. 16A is an isometric view of a cone without an orifice; FIG. 16B is an isometric view of a cone with an orifice; and FIG. 17 is an isometric view of a semi-circular retainer according to an example embodiment Referring to FIGS. 15 through 17, a screening system 38 includes screens of different diameters 39. FIGS. 16-A and 16B show cone elbow parts with and without orifices. Additionally, there is included a semi-circular retainer 42 whose structure has orifices 43 for subjection.

The screening system 38 is placed inside the horizontal cone 37. The vertical cone 23 is inserted inside the horizontal cone 37 by means of the orifice 34 (see FIG. 14). An elbow 40 is fitted internally in the output of the vertical cone 23. Elbow 40 is oriented to the narrowest part of the horizontal cone 37 and is fixed with screws. Another elbow 41 is fitted outwards in the narrowest part of the horizontal cone 37, as shown best in FIG. 16B. A vertical discharge tube is fixated to the elbow 41, to pour the liquid to a recirculation tank 51 (see FIG. 25). The submersible pumps rest on a grid 56 (see FIG. 25).

The following discussion is centered on FIGS. 18-29 to describe the remaining constituent elements which make up the example system and device according to the example embodiments. Occasional reference may be made back to earlier figures for purposes of clarity.

Figure 19:
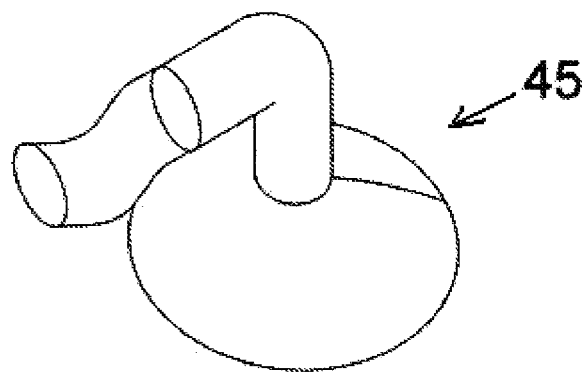
FIG. 19 is an isometric view of an elbow of a sprinkler that forms part of the emission purifying system and device according to the example embodiments.
Figure 20:
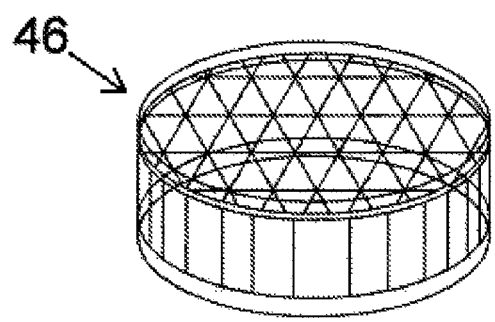
FIG. 20 is an isometric view of a screen that forms part of the emission purifying system and device according to the example embodiments.
Figure 21:
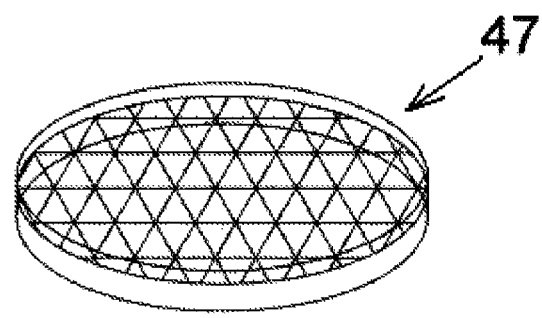
FIG. 21 is an isometric view of a filter that forms part of the emission purifying system and device according to the example embodiments.
Figure 22:
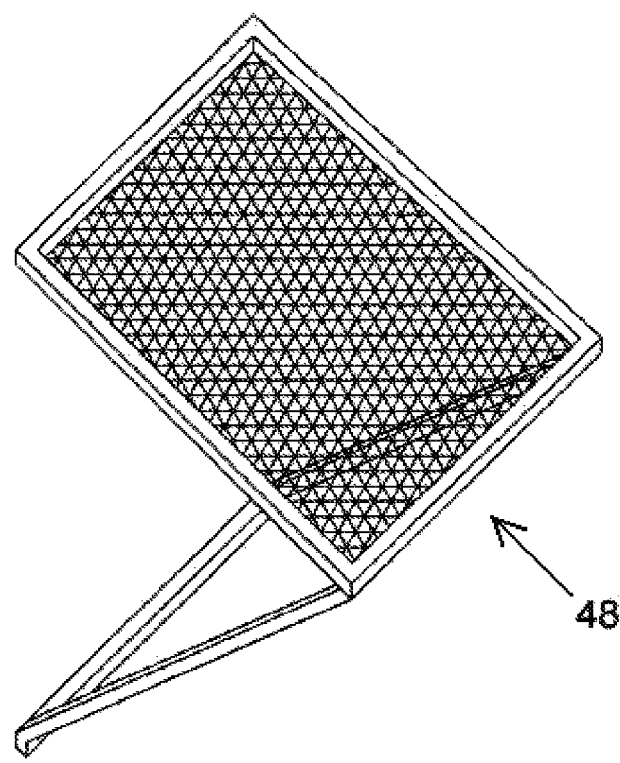
FIG. 22 is an isometric view of a base for an extractor that forms part of the emission purifying system and device according to the example embodiments.
Figure 23:
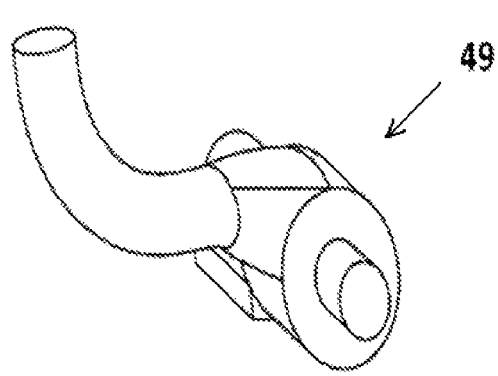
FIG. 23 is an isometric view of an air extractor that forms part of the emission purifying system and device according to the example embodiments.
Figure 24:
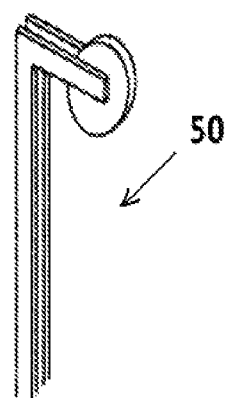
FIG. 24 is an isometric view of a pulley system that forms part of the emission purifying system and device according to the example embodiments.

FIG. 18 illustrates side, perspective and top views of a tight-fit lid of the horizontal cone according to the example embodiments. The semicircular retainer 42 is placed at the widest end of the horizontal cone 37 and secured with four screws inside the horizontal cone 37. Afterwards, the lid 44 of the horizontal cone 37 is closed. Lid 44 includes formed passageways or bores 66 therein which matingly receive connector piping for the air ejectors 49. FIG. 19 shows an elbow 45 that is connected to each of the sprinklers 30 on the horizontal cone 37.

Mountings for the base 48 for air extractors (FIG. 22) are placed on the ladders (28, 28') which support the horizontal cone 37, and air extractors 49 (FIG. 23) are placed on base 48. Here, the extractor 49 fitted in the widest part of the horizontal cone 37 is placed in an inverted position so that it works as an impeller. Another air extractor 49 is placed on the ground, also in an inverted position so that it can work as an emergent impeller. Both impellers (air extractors 49) are connected to the lid 44 of the horizontal cone 37.

In its narrowest part, the horizontal cone 37 is connected with a tube to the elbow 41 which connects the output of the horizontal cone 37, shown in FIG. 14, the chimney 36 or the output of clean gases has a screening system 46 and a filter 47, (FIGS. 21 and 22), and in the external part of the chimney 36, a pulley 50 is fitted (see FIG. 24), so that the filter 47 can be changed.

FIG. 25 is an isometric view of a storage tank for captured particles that forms part of the emission purifying system and device according to the example embodiments; and FIG. 26 is an isometric view of a submersible pump for the storage tank of FIG. 25. The storage tank 51 includes a cover 52, a cable duct out (not shown) and the hoses of the pump system 53, an output connector pipe from the horizontal cone element 54, a fluid peephole 55, a metal grid 56, a maintenance stopper 57, an output to connect the particle storage tank to the hydro pneumatic tank 58, and a level plug 59.

The tube inserted in the elbow 41 of the narrowest part of the cone 37 is placed in the storage tank 51 for suspended particles through the input duct on the storage lid 54 (FIG. 25). Additionally, an optional extractor 49 is mounted on the ladder 28/28' that supports the narrow part of the horizontal cone 37, it has the function of alleviate congestion in the horizontal cone 37 in case it gets saturated, returning the particles to the captured particles storage tank 51. In this case, the air extractor 49 will be connected by means of a flexible tube, from the output of the clean gases from chimney 36 to the connector 53 of the storage tank 51. The tank 51 has a system of submersible pumps 60. Also, the submersible pumps 60 are placed inside the storage tank 51; pumps 60 rest on grid 56.

FIG. 27 is an isometric view of a hydro pneumatic tank that forms part of the emission purifying system and device according to the example embodiments; FIG. 28 is an isometric view of a "Y" connector connected to the submersible pump of FIG. 26; and FIG. 29 is an isometric view of a heat collector cylinder that forms part of the emission purifying system and device according to the example embodiments.

Referring to FIGS. 27-29, hydraulic output 61 of each of these submersible pumps is connected to a "Y" connector 63 through the exit 53 of the storage tank 51; each "Y" connector 63 is connected to the sprinkler 30 network of the horizontal cone 37 and to the ring shaped tubular sprinkler (of vertical cone 23) by means of pipes subjected with clamps. The hydro pneumatic tank 62 is connected to the flow distributor 27 (see FIG. 11); this is connected to the storage tank 51 at the outputs 58. There is a line which comes out of the flow distributor 27 and it is connected to the same "Y" connectors network 63 forming only one line which supplies all of the sprinklers 30 of the horizontal cone 37 and those of the flow distributor 27 itself.

A line is taken to connect the cooling coil 26 (see FIG. 10). The heat collector cylinder 65 of FIG. 29 with an integrated heat transfer fin-equipped cylinder system can be placed in a horizontal position in the lower part of the vertical cone 23, or attached to any side of the supporting table 1, or can be connected at one end to an air compressor. Heat collector cylinder 65 receives the steam from the elevated tank 10 to be used in different processes. The flow distributor 27 is connected eventually to a line of the circular sprinkler 24 (see FIG. 8) for maintenance of the vertical cone 23.

Figure 30:
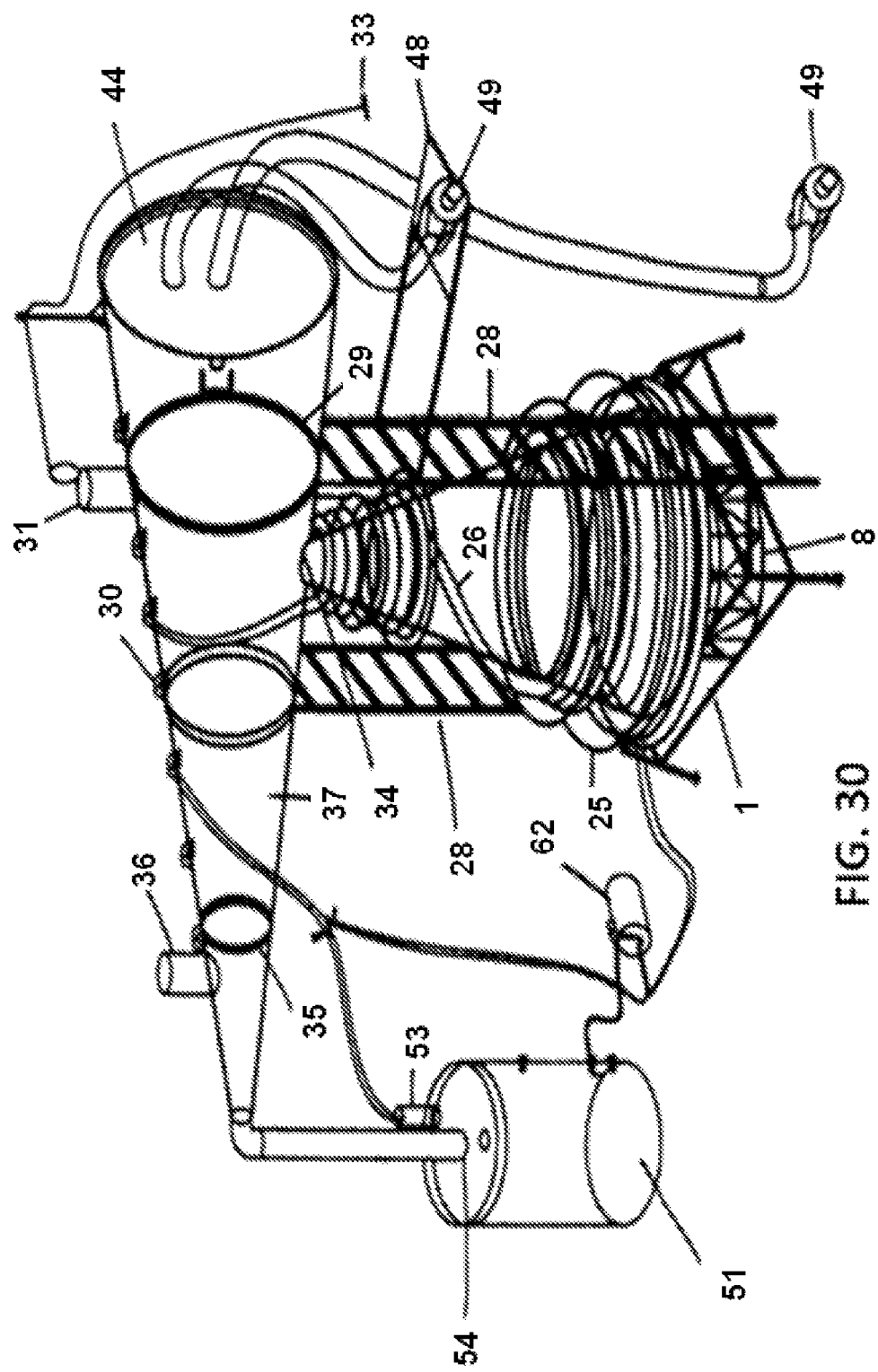
FIG. 30 is a plan view of an example emission purifying system according to the example embodiments.
Figure 31:
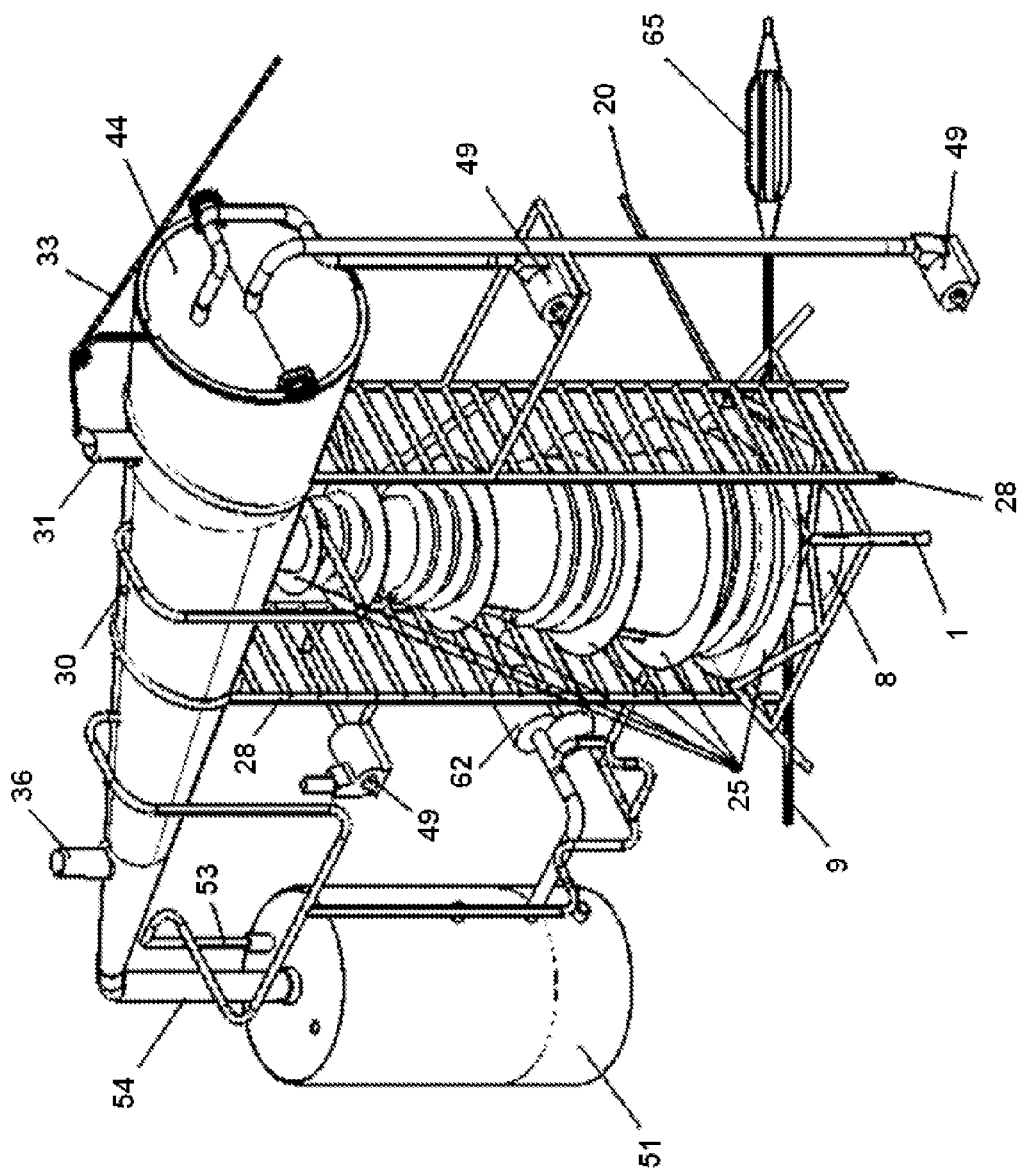
FIG. 31 is a perspective view of the example emission purifying system of FIG. 30 with other constituent components illustrated therein.
Figure 32:
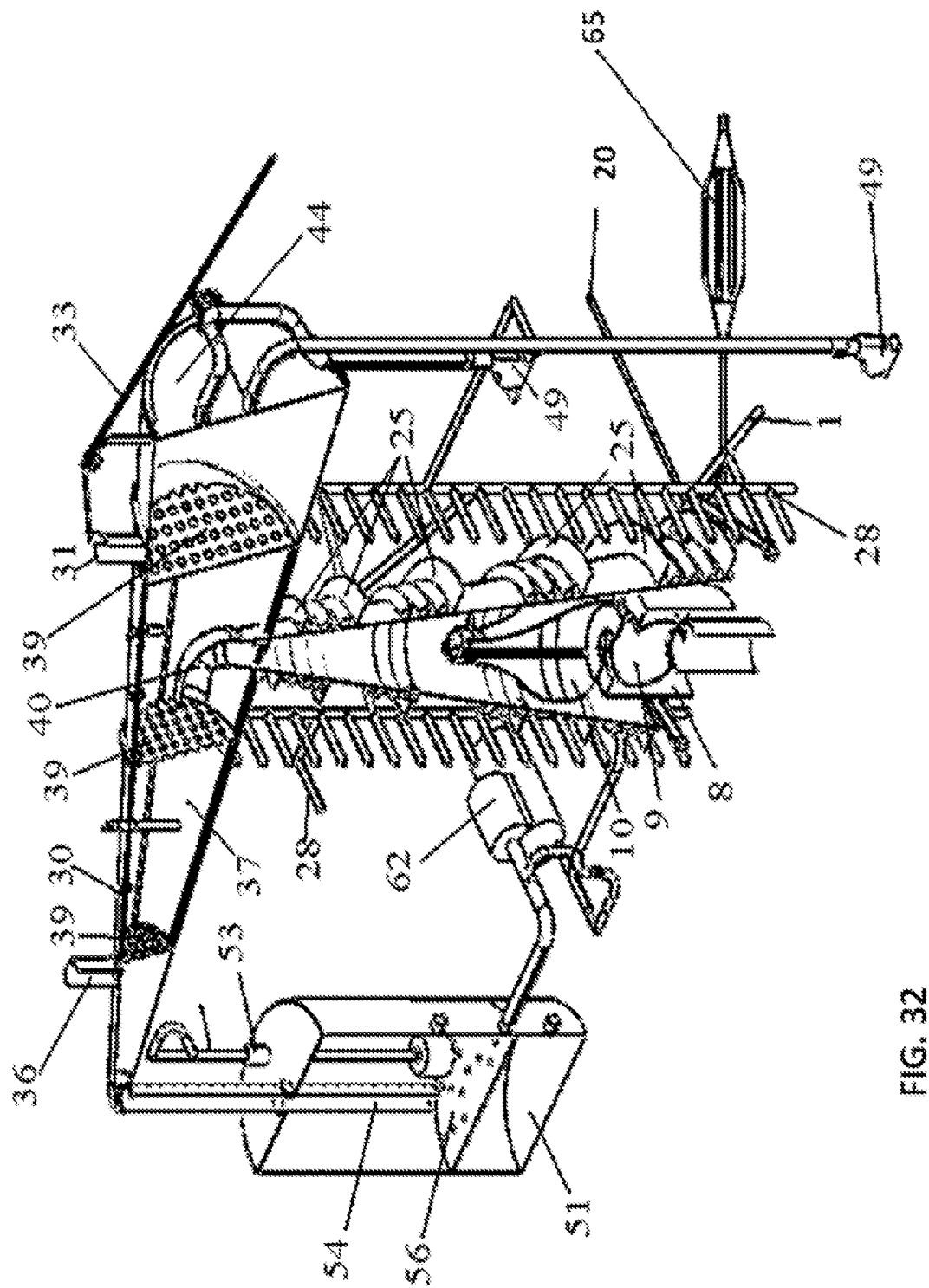
FIG. 32 is a partial cutaway perspective view of the example emission purifying system of FIG. 30 with selected internal details illustrated therein.

FIG. 30 is a plan view of an example emission purifying system according to the example embodiments; FIG. 31 is a perspective view of the example emission purifying system of FIG. 30 with other constituent components illustrated therein; and FIG. 32 is a partial cutaway perspective view of the example emission purifying system of FIG. 30 with selected internal details illustrated therein. FIGS. 30-32 should be referenced for the following discussion regarding the general operation of the system and/or device according to the example embodiments herein.

To eliminate smoke and suspended particles, the vertical cone 23 encloses and conducts the particles to the horizontal cone 37. There, the smoke and/or particulate are driven through the various screens 39 attached to the horizontal cone 37 in spaced relation thereof. At the same time, an artificial turbulence is produced by means of the water sprinklers 30 and air impellers (extractors) 49. The suspended particles are driven to the storage tank 51 and simultaneously, the water is sent to the sprinklers 30 in a cyclic way.

The heat of the flame and the temperature of the combustion gases is reduced when it is used to heat the elevated tank 10, which is located inside the vertical cone 23 held by a support base 8. The elevated tank 10 is full at 65% of its capacity, generating steam which can be used externally for a variety of purposes and benefits. At the same time, water is driven through the coil 26 which is on the outside of the vertical cone 23 which is supplied by the hydro pneumatic tank 62, which in turn is supplied by the suspended particles storage tank 51. The coil 26 is supported by the heat diffuser discs 25. Also, the artificial turbulence in the horizontal cone 37 lowers the temperature of the emissions.

Meanwhile, the screen 39 retains the suspended particles and is lubricated by the sprinklers 30. The vertical cone 23 and the horizontal cone 37 help to reduce the noise of the gas emanations that comes out of the burner nozzle (not shown) due to the circulation of the noise from the wide part of the cone to the narrow part of each cone. The ignition sphere 9 is kept burning for security reasons, in case the burner is turned off accidentally.

The circular channel 2 with drain pipe 4 located on the base of the vertical cone 23 is used to collect dripping during maintenance service. The tubular ring with the external input from the vertical cone 23 is used to give maintenance service and to clean the vertical cone 23. The semicircular retainer 42 works as security element, preventing leakages from the horizontal cone 37.

The hydro pneumatic tank 62, with the flow distributor 27, has the function of recycling the air and water for the entire system in a cyclic process. The heat collector cylinder 65 with an integrated partition system is an optional device that has the function of collecting the heat generated by the flame to turn it into steam, to be transformed into power by means of an air compressor. The elevated tank 10 has the function of producing high pressure steam which can be utilized as kinetic energy to move turbines, engines and produce electricity, or subject the steam to a distillation process to produce distilled water, or even to a de-ionizer to produce de-ionized, distilled water.

Accordingly, the example system and/or device described herein may be embodied as portable equipment installable onto outdoor burners as well as in chimneys of any industry. The example system has the purpose of cleansing the emissions of gases and transforming the thermal energy into useful kinetic energy.

In an example, the system can be placed by means of its base 1 on the top of an outdoor burner or industrial chimney in such a way that the burner's flame or industrial chimney remains in the center of the system or device. The system or device has an ignition sphere 9 that is kept burning all the time for security reasons.

Combustion gases ascend through a vertical cone 23 to pass over the outside of an elevated tank 10 which contains water and is locked. This elevated tank 10 is configured to generate steam utilizing the heat of the combustion gases, and the direct heat of the flame in the case of the burners. The tank 10 is formed with a bottle-shaped body, being wider at the bottom and narrower at the upper end thereof. The tank 10 has a convex base with bottleneck 11 at top end to improve the distribution of the heat around the tank body. The tank 10 bottom is connected to a pipe 12 which has a discharge valve 13 on one end thereof that allows drainage of the elevated tank 10 for maintenance and/or service.

The upper part of the mouth has an external thread to receive a lid 16 which has an internal thread so that it can permit a hermetic lock. Lid structure 14 includes a filling system made formed by a pipe 19 with a shutoff valve 18, a water volume meter 17, a hermetic closure valve 15, the lid itself 16, and an exit for the steam which includes a pipe 20 fitted with a valve 22 and a manometer 21. Here, the steam coming out of the pipe 20 is used in an electric generator or sent to a heat exchanger (i.e., heat collector cylinder 65).

The combustion gases are cooled inside the vertical cone 23 by direct contact with the elevated tank 10 and outside by means of the ascending cooling coil 26, which is supported by diffuser discs 25 which supply in an extreme part of the sprinklers 30 of the horizontal cone 37. Additionally, on the inside of the vertical cone 23, the combustion gases pass through a circular sprinkler 24. The supply elbow 40 at the upper end of the vertical cone 23 feeds the combustions gases to the second section, taking the gases to the narrow end of the horizontal cone 37. This elbow 40 is connected to an orifice 34 of the horizontal cone 37. The supply elbow 40 that feeds the horizontal cone 37, besides driving the gases to the narrow end, also increases the drop of pressure of the combustion gases.

The combustion gases expand suddenly when they enter the horizontal cone 37. Thus, the gases lose pressure due to this free expansion; the gases are directed to the narrow part of the cone 37 by means of air extractors 49 connected in an inverted way, or blowers which are connected to a lid 44 of the horizontal cone 37. These air extractors 49 move the gases to the narrow end for cleansing and cooling by the sprinklers 30 fitted along the horizontal cone 37, screens 39 and the circular sprinkler 35, precipitating the suspended particles into a stream of water. This water flows via gravity towards the narrow part of the horizontal cone 37 because the lowest part of the horizontal cone 37 corresponds to the narrowest end, where there is an elbow 41 which is connected to a pipeline that transports the mixture of liquid and particles to a storage tank 51. Near the narrow end of the of the horizontal end and after the circular sprinkler 35, there is a chimney 36 or exhaust pipe for the clean gases which contains a screen 46, a filter 47, and optionally an air extractor 49 which extracts the suspended particles which could leak to send them to the storage tank 51 by means of connector 53.

Additionally, as a precaution measure, the horizontal cone 37 has an emergency chimney or exhaust 31 which comes into play when the pressure inside the cone 37 increases beyond some desired set point. This chimney or exhaust can be operated manually by means of a whip mechanism 33.

The example system is further configured with a fluid distribution network which supplies the cooling coil 26 and a sprinklers section (sprinkler 24 for example) by means of a hydro pneumatic tank 62. Additionally, a submersible pump 60 sends water to another sprinklers section (sprinklers 30, 35) Both the pump 60 and tank 62 take the water from the storage tank 51, keeping the cycle closed and preventing the waste of water.

The example system and device may provide several benefits, including but not limited to one or more of: reduction in temperature of emanations and heat radiated by the flame; diminish the intensity of sound produced by the burning flame; shutting off the heat generated by the flame and transforms heat into kinetic energy to be utilized for different purposes for various uses as move engines, power generators, driers and dehydration; eliminate the characteristic odors of emanations; utilizing captured particles industrially, as they are stored as they are stored as liquid and solid waste which can be used to make toner and ink, and in the construction industry, to make bricks, asphalt emulsions as well as other uses the concentrated particles can have; promote ease of assembly and accommodation to size and scale; promote ease of transport, mobility and flexibility in its operation.

Moreover, the example system and device may capture and collect pollutant suspended particles, thus preventing clean air from getting polluted, further suppressing outdoor fires and heat radiated into the atmosphere caused by combustion fires, possibly decelerating global warming, while simultaneously suppressing the odors of combustion and additive pollution. The example technology herein may reduce and/or help to eliminate or prevent acid rain, and allow for the utilization of the thermal energy in the form of steam and kinetic energy and reduced the temperature of combustion.

The example embodiments being thus described, it will be obvious that the same may be varied in many ways. Such variations are not to be regarded as departure from the spirit and scope of the example embodiments, and all such modifications as would be obvious to one skilled in the art are intended to be included within the following claims.

I claim:

1. An emissions purifying system, comprising:
    a vertical conical section having a body with a wider conical base and tapering into a narrower conical top, a plurality of diffuser discs fitted in spaced relation around an external surface of the vertical conical section, the diffuser discs supporting cooling piping for transferring heat from combustion gases thereto
    a horizontal conical section connected to the vertical conical section, the horizontal conical section having a body with a first wider conical end and a narrower second conical end, the horizontal conical section including a chimney,
    an elevated tank supplied with water and supported by a base within the vertical conical section,
    a burner situated under the elevated tank, wherein combustion gases ascending over the vertical conical section to be driven up to the horizontal conical section pass over the elevated tank and release heat to the tank, the retrieved heat utilized to generate steam in the elevated tank to be transformed into work,
    the diffuser discs serving as a support for the cooling piping to diminish the temperature of the combustion gases, and
    a narrowest end of the horizontal conical section being situated in a lower position with respect to the rest of the body and including piping for water collection in a lowest end of the horizontal conical section, the chimney oriented upwards near the narrowest end through which cleansed combustion gases are expelled.

2. The system of claim 1, wherein the elevated tank has a convex-shaped bottom which tapers to a bottleneck upper end to facilitate the distribution of heat outside the tank body.

3. The system of claim 1, wherein
    the cooling piping is embodied as an external cooling coil supported by the diffuser discs, the cooling coil supplying water to a plurality of sprinklers arranged on the horizontal conical section, and
    combustion gases are cooled inside the vertical conical section by direct contact with the elevated tank and externally by the cooling coil.

4. The system of claim 1, wherein
    the vertical conical section is connected to the horizontal conical section near the wider conical base via an elbow that drives the gases to the narrower end and increases the drop of pressure of the combustion gases,
    the horizontal conical section includes a lid over the base where air is supplied therein by a plurality of air extractors connected to the horizontal conical section,
    the horizontal conical section further including a plurality of circular screens fitted in different sections therein, and a plurality of sprinklers in spaced relation thereon, the air extractors moving the cooled combustion gases to the narrower end for cleansing and cooling by the screens and sprinklers, precipitating any suspended particles into a stream of water.

5. The system of claim 1, wherein the elevated tank includes an exit for generated high pressure steam comprising a pipe fitted with a valve and a manometer, the high pressure steam configured for use in one or more of electric power generation, distillation or heat exchange operations.

6. The system of claim 1, further comprising:
    a suspended particles collection tank for separating water from any solid particles contained in the cooled steam that is driven into the horizontal conical section from the vertical conical section after passing over the elevated tank.

7. The system of claim 1, further comprising:
    an emergency system configured to be manually operated in case of an emergency, the emergency system fitted near the wider conical base of the horizontal conical section.

8. The system of claim 1, wherein the horizontal conical section includes a shower-type sprinklers system arranged as a plurality of sprinklers in space related along a surface thereof, and a ring-shaped tubular sprinkler fitted in the narrower end before the chimney.

9. The system of claim 1, wherein the horizontal conical section includes an air extractor to unclog oversaturation in the system, sending any suspended particle-laden liquid to a storage tank connected thereto.

10. The system of claim 1, further comprising:
    a lightning rod attached to an external surface of the horizontal conical section.

11. The system of claim 1, further comprising:
a sprinkler system for cleansing the combustible gases, the sprinkler system comprising at least one sprinkler in each of the vertical and horizontal conical sections, and
a flow distribution network to supply water to the sprinkler system, the flow distribution network including a hydro pneumatic tank to supply pressurized water from a collection tank to the sprinklers, a connection network to distribute the water, and at least one submersible pump to maintain water pressure in the network.

12. The system of claim 1, further comprising:
an ignition sphere for maintaining a constant burner activity, the ignition sphere including a spherical canister which contains a spherical volcanic rock piece.

13. The system of claim 1, further comprising:
a heat transfer fin-equipped cylinder to utilize the heat from the steam generated in the elevated tank.

14. The system of claim 1, further comprising:
one or more ladder supports for supporting the horizontal conical section above the vertical conical section, wherein
the base supports the vertical conical section, burner and elevated tank thereon.

15. A device for slowing global warming, comprising:
a vertical cone having a body with a wider conical base and tapering into a narrower conical top, the body supporting cooling piping on an external surface thereof for transferring heat from combustion gases thereto,
a horizontal conical section attached above the vertical conical section, the horizontal conical section having a body with a first wider conical end and a narrower second conical end, the horizontal conical section including a chimney,
an elevated tank supplied with water within the vertical conical section,
a burner situated under the elevated tank, wherein
combustion gases ascending over the vertical conical section to be driven up to the horizontal conical section pass over the elevated tank and release heat to the tank, and
a narrowest end of the horizontal conical section includes piping for water collection, the chimney oriented upwards near the narrowest end through which cleansed combustion gases are expelled.

16. The device of claim 15, wherein the elevated tank has a convex-shaped bottom which tapers to a bottleneck upper end to facilitate the distribution of heat outside the tank body.

17. The device of claim 15, wherein
the cooling piping is embodied as an external cooling coil supported by a plurality of diffuser discs, the cooling coil supplying water to a plurality of sprinklers arranged on the horizontal conical section, and
combustion gases are cooled inside the vertical conical section by direct contact with the elevated tank and externally by the cooling coil.

18. The device of claim 15, wherein
the vertical conical section is connected to the horizontal conical section near the wider conical base via an elbow that drives the gases to the narrower end and increases the drop of pressure of the combustion gases,
the horizontal conical section includes a lid over the base where air is supplied therein by a plurality of air extractors connected to the horizontal conical section,
the horizontal conical section further including a plurality of circular screens fitted in different sections therein, and a plurality of sprinklers in spaced relation thereon, the air extractors moving the cooled combustion gases to the narrower end for cleansing and cooling by the screens and sprinklers, precipitating any suspended particles into a stream of water.

19. The device of claim 15, wherein the elevated tank includes an exit for generated high pressure steam configured for use in one or more of electric power generation, distillation or heat exchange operations.

20. An emissions purifying system, comprising:
a vertical cone having a body with a wider conical base and tapering into a narrower conical top, the body supporting a plurality of diffuser discs on an external surface thereof,
a cooling coil supported by the diffuser discs for transferring heat from combustion gases thereto,
a horizontal conical section attached above the vertical conical section, the horizontal conical section having a body with a first wider conical end and a narrower second conical end, the horizontal conical section including a plurality of circular screens fitted in different sections therein, a plurality of sprinklers in spaced relation thereon, and a chimney,
an elevated tank supplied with water within the vertical conical section,
a burner situated under the elevated tank, wherein
combustion gases ascending over the vertical conical section to be driven up to the horizontal conical section pass over the elevated tank and release heat to the tank, the combustion gases being cooled inside the vertical conical section by direct contact with the elevated tank and externally by the cooling coil,
the vertical conical section being connected to the horizontal conical section near the wider conical base via an elbow that drives the cooled combustion gases to the narrower end and increases the drop of pressure of the combustion gases,
the air extractors moving the cooled combustion gases to the narrower end for cleansing and cooling by the screens and sprinklers, precipitating any suspended particles into a stream of water, and
a narrowest end of the horizontal conical section including piping for water collection, the chimney oriented upwards near the narrowest end through which cleansed combustion gases are expelled.

* * * * *